United States Patent
Fujimori et al.

(10) Patent No.: US 7,460,589 B2
(45) Date of Patent: Dec. 2, 2008

(54) EYE MONITORING AND RECONSTRUCTION USING CDR AND SUB-SAMPLING ADC

(75) Inventors: Ichiro Fujimori, Irvine, CA (US); Mohammad Sarhang Nejad, Newport Beach, CA (US)

(73) Assignee: Broadcom Corporation, Irvine, CA (US)

( * ) Notice: Subject to any disclaimer, the term of this patent is extended or adjusted under 35 U.S.C. 154(b) by 931 days.

(21) Appl. No.: 10/353,438

(22) Filed: Jan. 29, 2003

(65) Prior Publication Data

US 2004/0066867 A1    Apr. 8, 2004

Related U.S. Application Data

(60) Provisional application No. 60/416,931, filed on Oct. 8, 2002.

(51) Int. Cl.
*H04B 3/46* (2006.01)
(52) U.S. Cl. ...................................... 375/224
(58) Field of Classification Search ............... 375/224, 375/226, 227, 228, 232, 254, 278, 284, 285, 375/346, 371; 381/103; 708/322, 333
See application file for complete search history.

(56) References Cited

U.S. PATENT DOCUMENTS

| | | | |
|---|---|---|---|
| 3,721,959 A | 3/1973 | George | |
| 4,449,102 A | 5/1984 | Frazer | |
| 4,773,083 A * | 9/1988 | Baumbach et al. | 375/328 |
| 5,333,147 A * | 7/1994 | Nohara et al. | 375/224 |
| 6,256,342 B1 * | 7/2001 | Schlag et al. | 375/229 |
| 6,621,861 B1 * | 9/2003 | Shen | 375/226 |
| 6,973,600 B2 * | 12/2005 | Lau et al. | 714/704 |
| 6,993,700 B1 * | 1/2006 | Player et al. | 714/758 |
| 7,051,249 B2 * | 5/2006 | Pham | 714/704 |
| 7,110,768 B1 * | 9/2006 | Bridges et al. | 455/446 |

(Continued)

FOREIGN PATENT DOCUMENTS

GB    2094104    9/1982

OTHER PUBLICATIONS

Ellemeyer, T. et al., "A 10-Gb/s Eye-Opening Monitor IC for Decision-Guided Adaptation of the Frequency Response of an Optical Receiver," IEEE Journal of Solid-State Circuits, IEEE Inc. New York, US, vol. 35, No. 12, Dec. 2000, pp. 1958-1963.

*Primary Examiner*—Sam K Ahn
(74) *Attorney, Agent, or Firm*—McAndrews, Held & Malloy, Ltd.

(57) ABSTRACT

Apparatus and method are disclosed for constructing an eye pattern from a serial data signal within a receiver used in a serial data communication system. The receiver is used to receive the serial data signal and generates an internal clock signal from the serial data signal using, at least in part, a CDR circuit. Timing data corresponding to a current phase of the clock signal is also generated within the receiver using an interpolator circuit. The serial data signal is sampled by an ADC using the clock signal to generate sampled data. The sampled data and timing data are processed within the receiver by a data processor to generate the eye pattern. The resultant eye pattern may be analyzed within the receiver with respect to at least one characteristic of the eye pattern. At least one parameter of the receiver may be adjusted in response to the foregoing analysis.

38 Claims, 7 Drawing Sheets

U.S. PATENT DOCUMENTS 7,295,960 B2 * 11/2007 Rappaport et al. ............ 703/13
2002/0126784 A1 * 9/2002 Brazeau et al. ............. 375/371
2003/0043440 A1 * 3/2003 Suzaki et al. ............... 359/189

* cited by examiner

FIG. 7a  ideal eye pattern
FIG. 7b  time jitter
FIG. 7c  intersymbol interference
FIG. 7d  time jitter and intersymbol interference

EYE MONITORING AND RECONSTRUCTION USING CDR AND SUB-SAMPLING ADC

CROSS-REFERENCE TO RELATED APPLICATIONS/INCORPORATION BY REFERENCE

This application makes reference to, claims priority to and claims the benefit of U.S. provisional patent application Ser. No. 60/416,931 filed on Oct. 8, 2002.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Embodiments of the present invention relate generally to a system and method corresponding to a receiver in a serial digital communications system, and more particularly to an eye pattern of a serial data signal being received.

The quality of a received serial data signal may be characterized by generating an eye pattern from the serial data signal. An eye pattern is a measure of the serial data signal over a time interval (−T, T), where T is the bit-period of the signal, and is the superposition of the individual segments of the serial data signal.

For example, an eye pattern may be formed by feeding the received serial data signal into an oscilloscope in infinite persistence mode and continuously triggering the oscilloscope by the bit clock of the signal. Other test equipment designed especially for testing serial data signals may also be used to generate an eye pattern.

The eye pattern characterizes the quality of the received signal by showing rise and fall transitions, bit pattern distortions caused by the transmission and receive channels, the boundary within which no waveforms exist for any code pattern, inter-symbol interference (ISI), and jitter.

Having to generate and monitor an eye pattern externally to a serial digital communications system using external test equipment is cumbersome, time consuming, and does not allow for real-time, operational monitoring of signal quality.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain embodiments of the present invention provide an apparatus and a method to construct and analyze an eye pattern, within a receiver for use in a serial data communication system, from a received serial data signal. Parameters of the receiver may be adjusted based on the foregoing analysis of the eye pattern.

A method of the present invention provides for constructing an eye pattern from a serial data signal within a receiver for use in a serial data communication system. The receiver is used to receive the serial data signal and generates an internal clock signal from the serial data signal. Timing data corresponding to a current phase of the clock signal is also generated within the receiver. The serial data signal is sampled using the clock signal to generate sampled data. The sampled data and timing data are processed within the receiver to generate the eye pattern. The resultant eye pattern may be analyzed within the receiver with respect to at least one characteristic of the eye pattern such as, for example, an extinction ratio of the eye pattern. A parameter of the receiver may be adjusted in response to the foregoing analysis.

Apparatus of the present invention comprises a clock data and recovery (CDR) circuit, within a receiver for use in a serial data communication system, to generate a first clock signal from a serial data signal. A divider circuit generates a second, lower frequency clock signal from the first clock signal. An interpolator circuit generates a third clock signal by shifting the phase of the second clock signal and also generates phase position data corresponding to a current phase of the third clock signal. A tracking-and-hold (T/H) circuit generates an aligned serial data signal by holding the serial data signal in alignment with respect to the current phase of the third clock signal. An analog-to-digital converter (ADC) generates sampled values from the aligned serial data signal in response to the third clock signal. A data processor generates an eye pattern in response to the sampled values and the phase position data. The data processor may analyze the eye pattern to generate control signals that adjust at least one parameter of the receiver.

These and other advantages, aspects and novel features of the present invention, as well as details of an illustrated embodiment thereof, will be more fully understood from the following description and drawings.

DETAILED DESCRIPTION OF THE INVENTION

Figure 1:
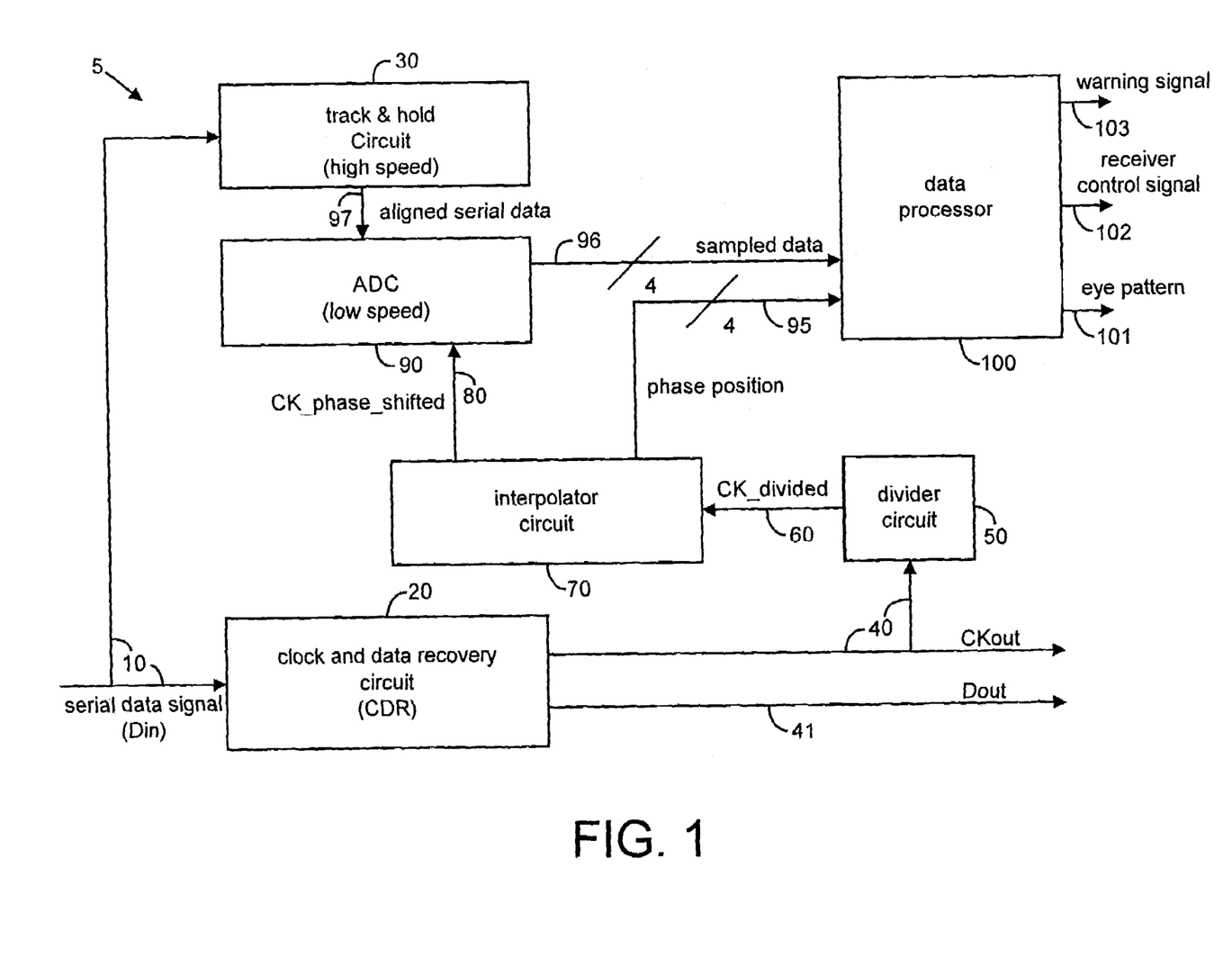
FIG. 1 is a schematic block diagram of an apparatus for reconstructing an eye pattern of a serial data signal, within a receiver for use in a serial data communication system, in accordance with an embodiment of the present invention.
Figure 2:
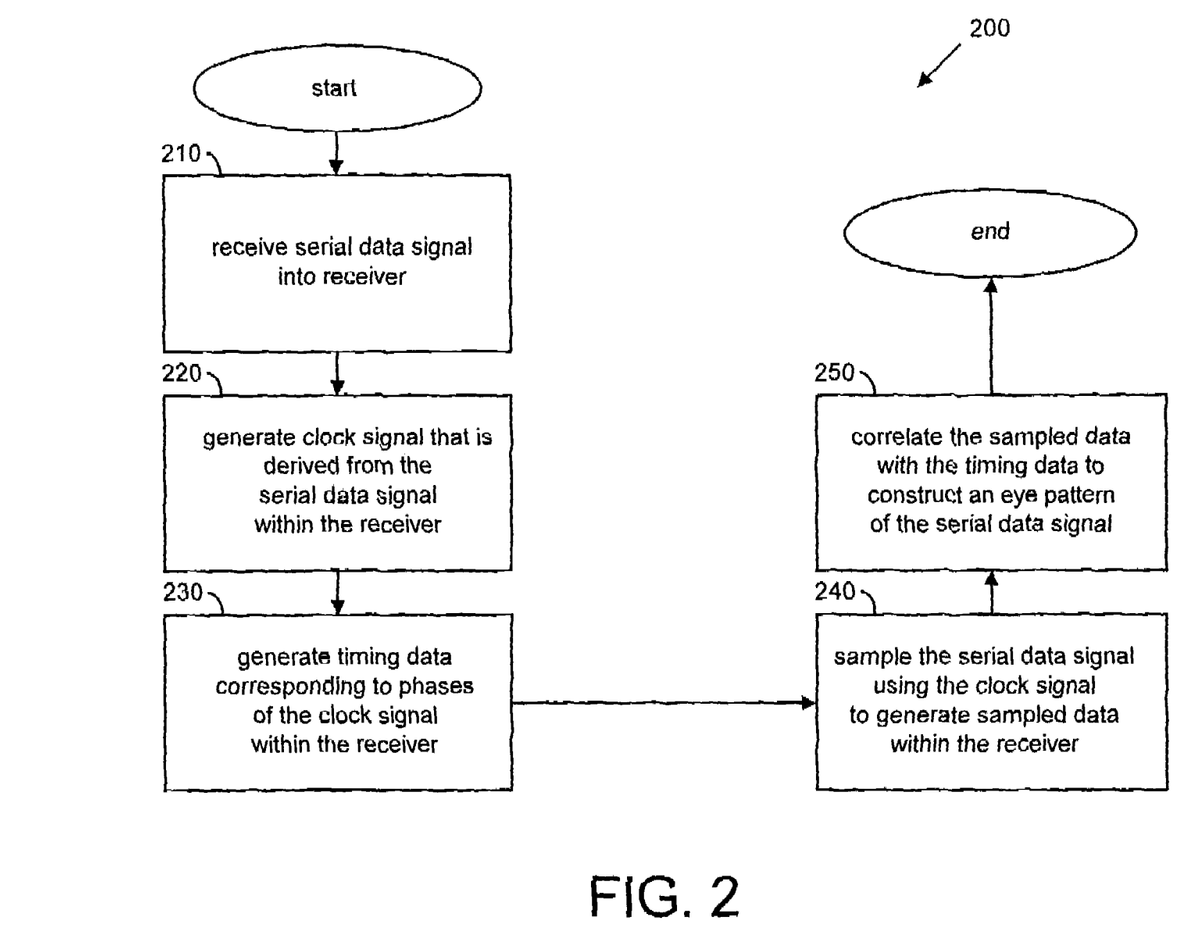
FIG. 2 is a flowchart of a method to construct an eye pattern, within the receiver of FIG. 1 and using the apparatus of FIG. 1, for example, from a serial data signal received by the receiver in accordance with an embodiment of the present invention.

FIG. 1 is a schematic block diagram of a system 5 for reconstructing an eye pattern of a serial data signal within a receiver, intended for use in a serial data communication system, in accordance with an embodiment of the present invention. FIG. 2 is a method 300 for reconstructing an eye pattern of a serial data signal within a receiver, intended for use in a serial data communication system, in accordance with an embodiment of the present invention.

Figure 4A:
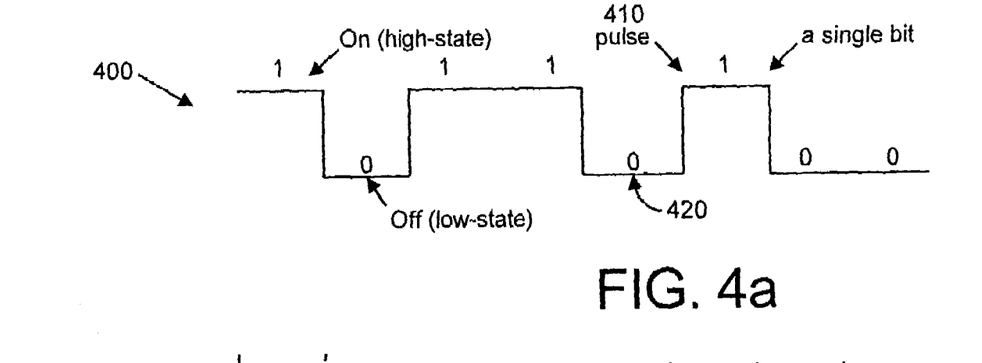
FIGS. 4a-4c are exemplary illustrations of serial data signals in accordance with an embodiment of the present invention.

A serial data signal comprises, for example, a sequence 400 of high and low digital states (i.e., ones and zeros) as shown in FIG. 4a. A one or zero appearing in the smallest interval in which a one or zero may appear is referred to as a bit. Typically, a one is defined by a positive going pulse 410 in the sequence 400. A zero is defined by the absence 420 of a pulse, or by a negative going pulse.

Figure 4B:
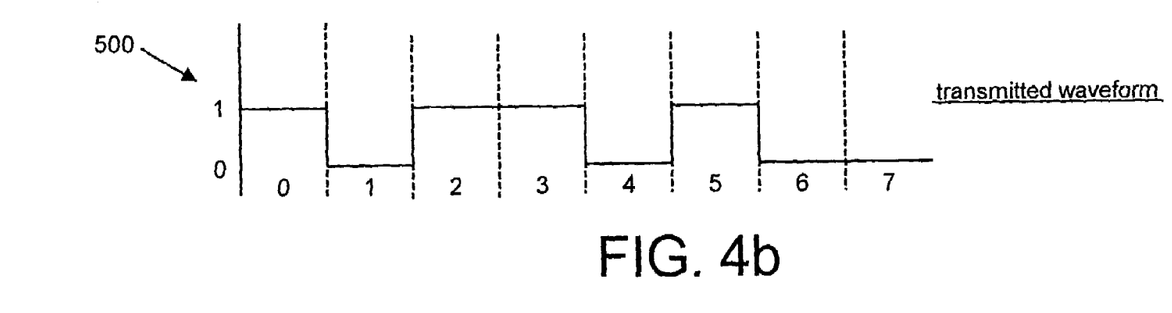
Figure 4C:
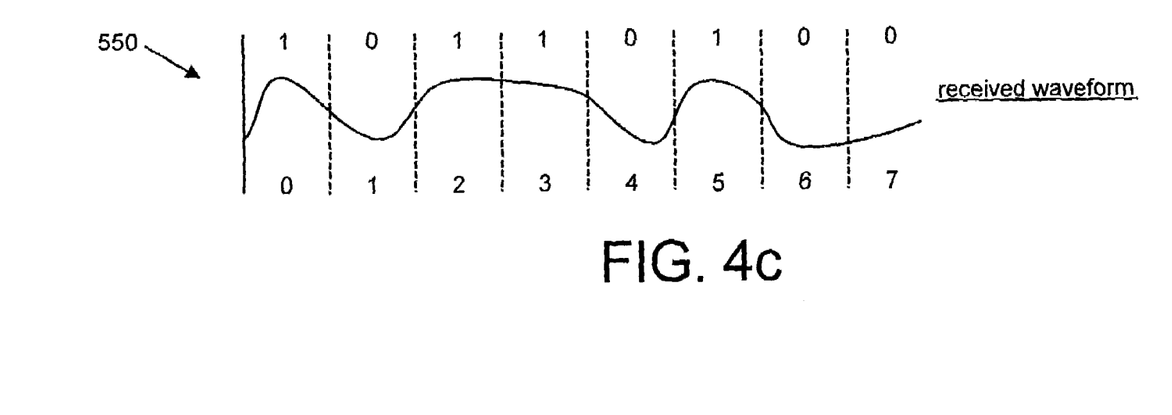

FIG. 4b. illustrates an exemplary transmitted serial data signal 500 comprising a sequence of ones and zeros as originating from a transmitter source of a serial data communication system. FIG. 4c illustrates an exemplary received serial data signal 550 derived from the transmitted serial data signal 500 after having propagated from a transmitter source to a receiver source of a serial data communication system. FIG. 4c shows how the received signal 550 may be degraded with respect to the original transmitted signal 500 due to various characteristics of the propagation path.

Figure 5:
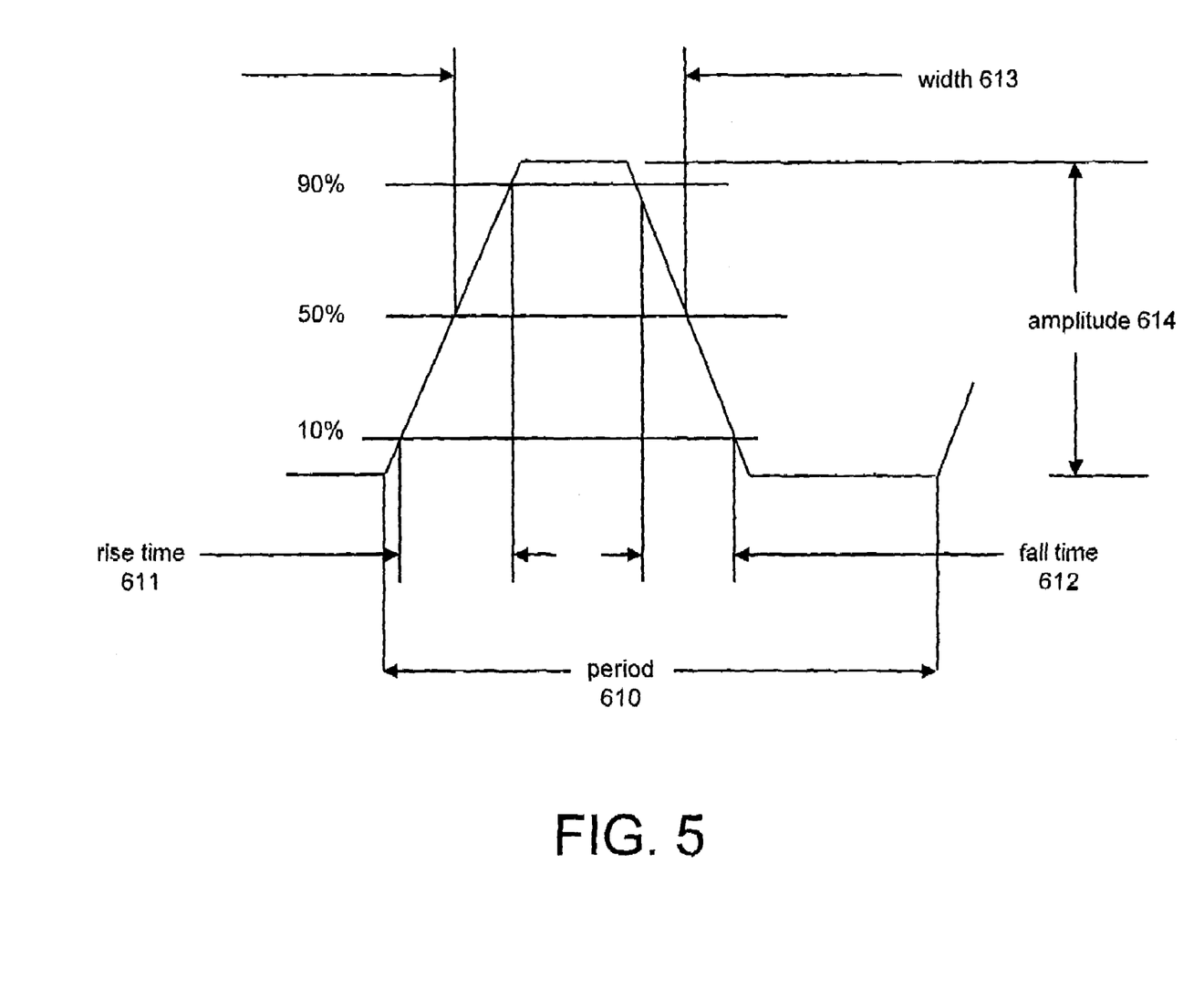
FIG. 5 is an exemplary illustration of a single cycle of a serial data signal, and certain characteristics of the single cycle, in accordance with an embodiment of the present invention.

FIG. 5 illustrates a transition 600 from a one to a zero over a single bit period 610 of a serial data sequence 400. Various parameters over the bit period 610 are shown, such as rise time 611, fall time 612, pulse width 613, and pulse amplitude 614.

Figure 6:
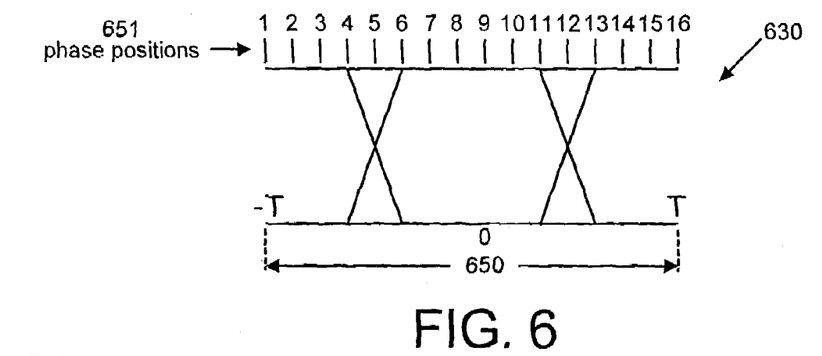
FIG. 6 is an exemplary illustration of an eye pattern over a time interval −T to T, where T is the bit period, in accordance with an embodiment of the present invention.

Referring to FIG. 6, an eye pattern 630 is a measure of the serial data signal 550 typically over the interval 650 of the serial data signal 550 corresponding to (−T, T) where T is the bit-period 610 of the signal. The eye pattern is the superposition of the individual segments of the serial data signal 550.

Referring again to FIG. 1 and FIG. 2, in accordance with an embodiment of the present invention, a serial data signal is received by the receiver as $D_{in}$ 10 in step 210 and is input to a clock and data recovery (CDR) circuit 20 and a high speed Track and Hold (T/H) circuit 30 within the receiver. In step 220, the CDR circuit 20 generates a first clock signal Ckout 40 from $D_{in}$ 10 having a frequency corresponding to a maximum bit rate of $D_{in}$ 10. Ckout 40 is also divided down in frequency by a factor N using a divider circuit 50 to form a second clock signal Ck_divided 60 in step 220. Finally, as part of step 220, Ck_divided 60 is input to an interpolator circuit 70 that phase shifts Ck_divided 60 to any of a number of pre-programmed phases to form a third clock signal Ck_phase_shifted 80.

The T/H circuit 30 tracks and holds Din 10 in alignment, with respect to a phase of Ck_phase_shifted 80, and presents an aligned serial data signal 97 to a low speed analog-to-digital converter (ADC) 90. The ADC 90 is clocked by Ck_phase_shifted 80 in order to digitally sample the serial data signal Din 10 in step 240.

In an embodiment of the present invention, the clock frequency of Ck_phase_shifted 80 is one tenth the frequency of Ckout 40 and, therefore, of the maximum bit rate of the serial data signal 10. Other clock frequencies may be used as well for sampling. By sampling the ADC 90 with a clock frequency substantially lower than the frequency of the serial data signal 10 (i.e., performing sub-sampling), the ADC 90 may be lower speed and, therefore, consume less power. Also, because Ck_phase_shifted 80 is derived from the CDR loop 20, the serial data signal 10 may be sampled without affecting the CDR locking.

The phase of Ck_phase_shifted 80 is controlled by the interpolation process used by interpolator circuit 70 in order to sample $D_{in}$ 10 across the interval (−T, T) 650 of the serial data signal 10. In an embodiment of the present invention, one sample of $D_{in}$ 10 is taken before moving to the next phase. Sixteen (16) phases are sampled across the bit-period forming 16 data samples and correspond to time intervals across the interval (−T, T) 650. The 16 phases (i.e., phase or timing data) are represented as 4-bits by interpolator circuit 70 in step 230 and are output to a data processor 100 as phase position data 95.

In an embodiment of the present invention, each of the 16 data sample values has a vertical voltage resolution of 4-bits (i.e., 16 voltage levels out of the ADC). The 4-bit sample data 96 is output to the data processor 100 for subsequent processing, as well. As an alternative, the sampled values may be current values in another embodiment of the present invention.

By having both the sample data 96 and the phase (time) position data 95, the data processor 100 is able to reconstruct the eye pattern of the serial data signal $D_{in}$ 10 as voltage (or current) versus time in step 250. The 16 phases correspond to 16 time intervals or phase positions 651 across the horizontal axis of the eye pattern 630 (see FIG. 6) since the horizontal axis of the eye pattern corresponds to the interval (−T, T) 650. Each phase position has one data sample associated with it. The sampling is repeated many times over many bit-periods of the serial data signal to fully construct the eye pattern 630.

In an embodiment of the present invention, the serial data signal may be sampled multiple times in a given phase. Also, other embodiments of the present invention may not limit the number of phases or the voltage sample resolution to 4-bits. For example, 32 phases (5-bits) may be sampled across the bit-period. As a further alternative, a 1-bit ADC could be implemented, which is essentially a comparator, to reconstruct the horizontal eye opening. Such a 1-bit ADC implementation would result in further power savings.

Figure 7A:
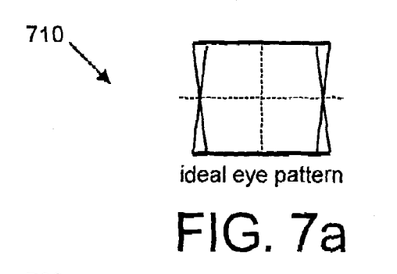
FIGS. 7a-7d are exemplary illustrations of constructed eye patterns with various combinations of jitter and inter-symbol interference in accordance with an embodiment of the present invention.
Figure 7B:
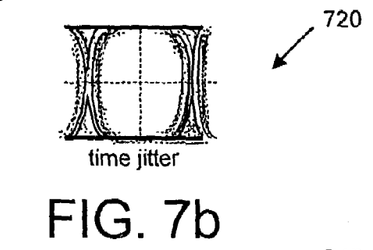

FIGS. 7b-d illustrate exemplary eye patterns that may occur having certain qualitative problems. For example, FIG. 7b illustrates an eye pattern 720 having a significant amount of time jitter with respect to what might be considered an ideal eye pattern 710 (FIG. 7a). Time jitter is small and rapid variations in the timing of a serial data signal typically caused by noise, changes in component characteristics, supply voltages, imperfect synchronizing circuits, etc. It appears as a thickening of the eye pattern.

Figure 7C:
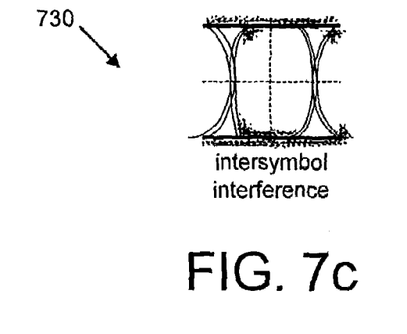

FIG. 7c illustrates an eye pattern 730 having a significant amount of inter-symbol interference with respect to what might be considered an ideal eye pattern 710 (FIG. 7a). Inter-symbol interference is a degradation in the eye pattern due to other bits interfering with the bit of interest. Inter-symbol interference typically appears as a "splitting" of the eye pattern as shown in FIG. 7c.

Figure 7D:
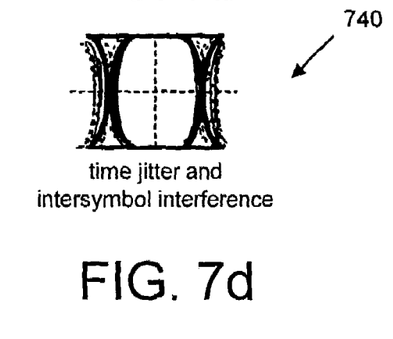

FIG. 7d illustrates and eye pattern 740 having a significant amount of both time jitter and inter-symbol interference with respect to what might be considered an ideal eye pattern 710 (FIG. 7a).

Figure 8:
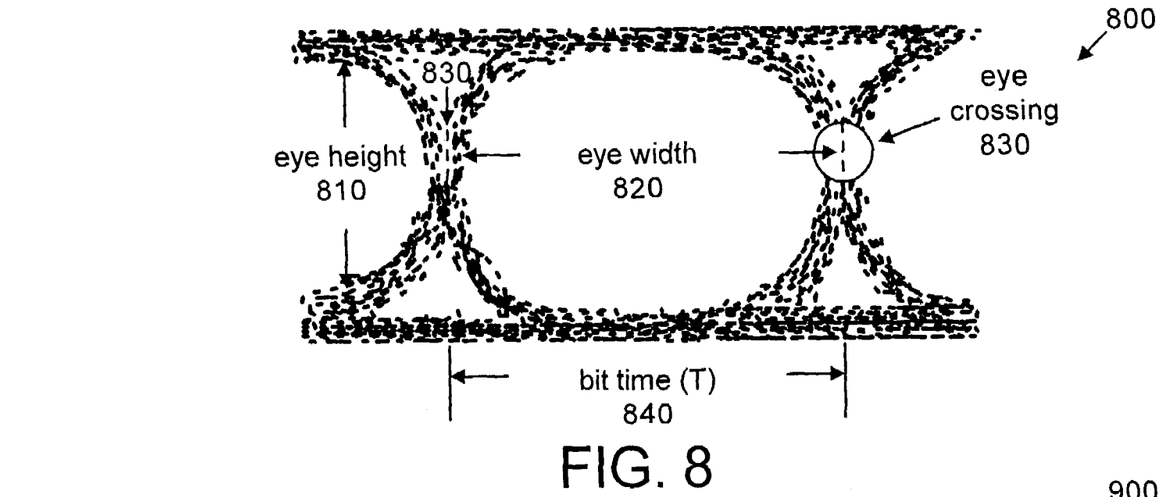
FIG. 8 is an exemplary illustration of a constructed eye pattern showing certain eye pattern characteristics in accordance with an embodiment of the present invention.

FIG. 8 illustrates an eye pattern 800 showing various eye pattern characteristics such as usable eye height 810, usable eye width, 820, and eye crossing points 830. The bit period T (or bit time) 840 is also shown with respect to the eye pattern 800. The bit period T tends to correspond to the time interval of the eye crossing points 830.

Figure 3:
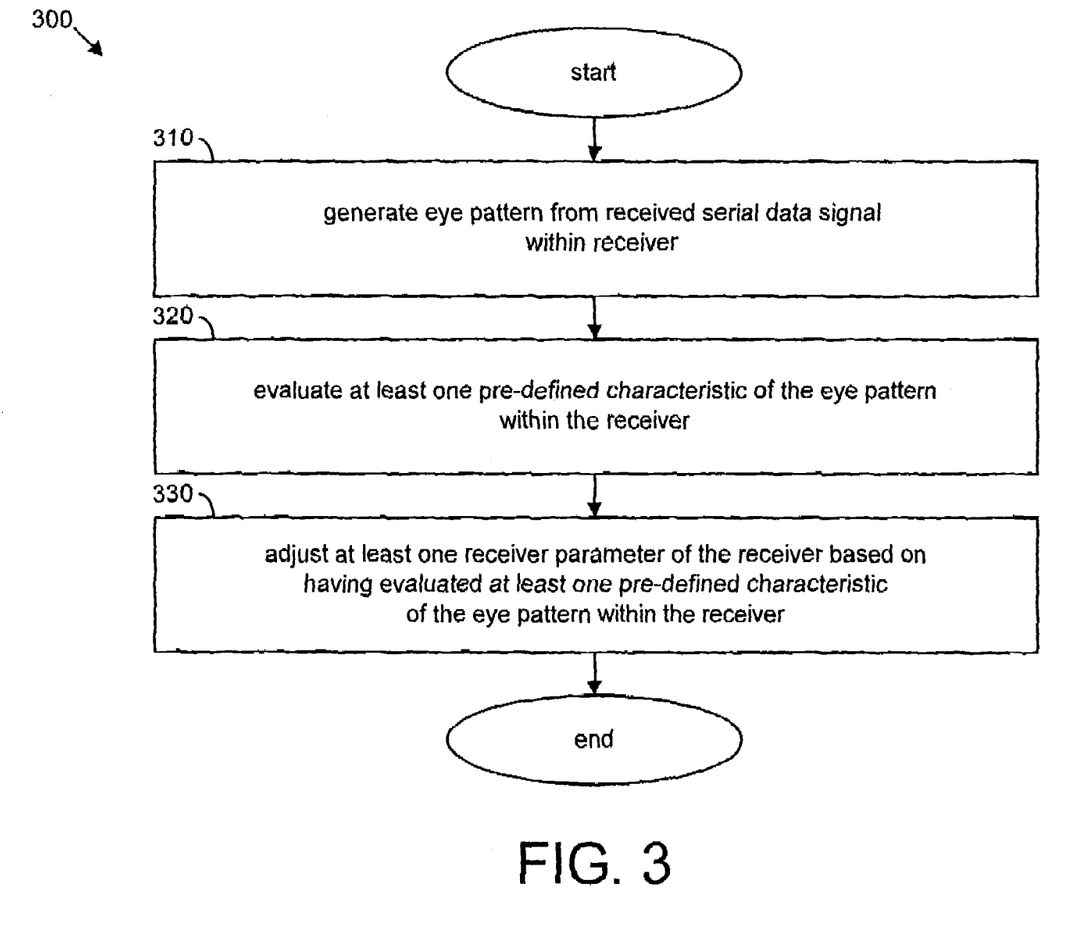
FIG. 3 is a flowchart of a method to adjust at least one receiver parameter of the receiver of FIG. 1, for example, by generating and evaluating an eye pattern in accordance with an embodiment of the present invention.

Referring to the method 300 of FIG. 3, once the eye pattern is constructed by the data processor 100 in step 310 (i.e., according to method 200, for example), the data processor 100 may analyze or evaluate the eye pattern, in step 320, to determine the quality of the serial data signal 10.

For example, the data processor 100 may measure certain characteristics of the eye pattern such as the jitter and inter-symbol interference previously discussed. Other characteristics that may be analyzed are, for example, rise time, fall time, vertical eye opening (height), horizontal eye opening (width), pulse distortion, cross-over points, bit period, and extinction ratio. The measured characteristics may be compared to pre-defined test values within the receiver or used to generate a receiver control signal 102 (see FIG. 1), in accordance with an embodiment of the present invention.

Figure 9:
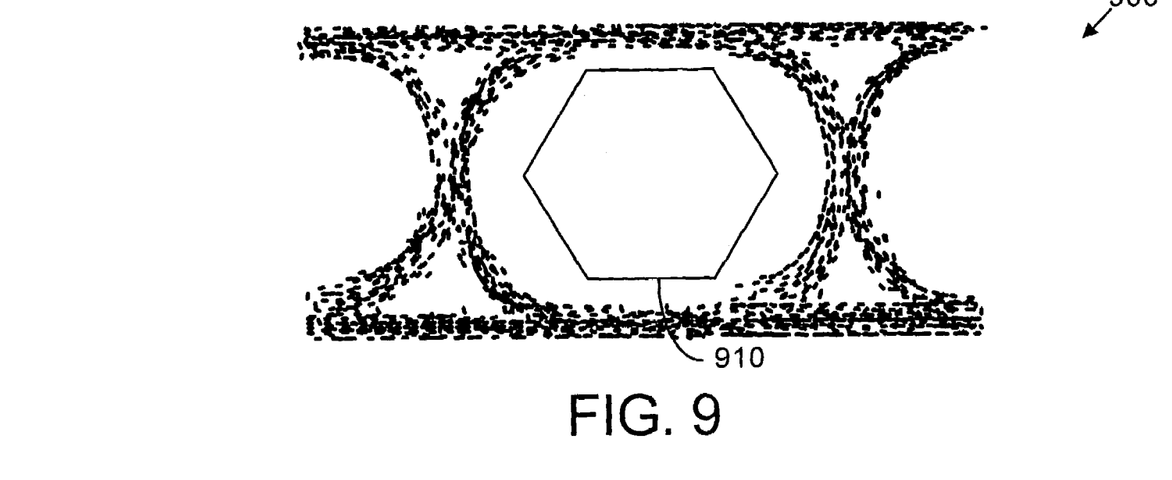
FIG. 9 is an exemplary illustration of a warning area, within a Bit-error-rate (BER) mask aligned with respect to a constructed eye pattern, that may result in generating warning signals when comparing the eye pattern, generated by the system of FIG. 1 according to the method of FIG. 2, for example, to the Bit-error-rate (BER) mask, within the receiver of FIG. 1, in accordance with an embodiment of the present invention.

As another example, the data processor 100 may compare the eye pattern to a mask 910 or predetermined template pattern to determine if any part of the eye pattern 900 intersects or comes within a predetermined guard distance of any boundary element of the template pattern 910 as shown in FIG. 9.

Warning signals 103 may be generated by the data processor 100 if the eye pattern 900 gets too close to or crosses over to the interior of the mask 910. The mask 910 corresponds to a bit-error-rate of the serial data signal 10 from which the eye pattern 900 was constructed. Bit-error-rate is the fraction of bits transmitted that is received incorrectly.

Analysis or evaluation of the constructed eye pattern may also be used to control receiver equalization within the receiver. Equalization is used to correct for the frequency response of various components of the serial data communication system such as a fiber optic cable.

The criteria of what constitutes an acceptable eye pattern may be customer defined. In an embodiment of the present invention, the template pattern (mask), guard distance, amount of acceptable jitter, etc. may all be defined by the customer and programmed into the receiver to be used by the data processor during eye pattern analysis.

In an embodiment of the present invention, both the eye pattern construction and the eye pattern analysis are performed within the receiver. As a result, in step 330, the results of the analysis may be used to adjust various parameters of the receiver. In other words, since the eye pattern information is in the receiver of the serial data communication system, the information may be used by the serial data communication system to attempt to optimize the received serial data signal.

For example, certain receiver parameters that may be adjusted as the result of constructing and analyzing the eye pattern include but are not limited to a receiver gain, a receiver frequency response, a receiver equalization, a receiver detection threshold, and a receiver limiting threshold. A receiver control signal 102 (see FIG. 1) may be generated by the data processor 100 to adjust a receiver parameter in accordance with an embodiment of the present invention.

In an embodiment of the present invention, the eye pattern is generated and analyzed continuously during normal operation of the receiver within the digital communication system.

In another embodiment of the present invention, the eye pattern is generated and analyzed periodically within the digital communication system.

The various elements of the system and method may be combined or separated according to various embodiments of the present invention. For example, the divider circuit 50 and the interpolator circuit 70 may be combined as a single circuit.

In summary, certain embodiments of the present invention afford an approach for constructing and monitoring an eye pattern of a serial data signal within a receiver of a digital communication system. Also, various parameters of the digital communication system may be adaptively adjusted based on the constructed eye pattern.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method to adaptively adjust receiver parameters of a receiver used for receiving a serial data signal in a serial data communication system, said method comprising:

generating an eye pattern from said received serial data signal within said receiver based on correlating a sampled data signal with a phase position signal, said phase position signal derived from a clock signal derived from said serial data signal, said sampled data signal generated from sampling said serial data signal using said clock signal;

evaluating at least one pre-defined characteristic of said eye pattern within said receiver, said evaluating comprising measuring said at least one pre-defined characteristic to generate at least one measured value and comparing said at least one measured value to at least one pre-defined test value; and adjusting at least one receiver parameter of said receiver based on said evaluating.

2. The method of claim 1 wherein said at least one pre-defined characteristic comprises at least one of:

a rise time of said eye pattern;
a fall time of said eye pattern;
a jitter of said eye pattern;
a vertical eye opening of said eye pattern;
a horizontal eye opening of said eye pattern;
an inter-symbol interference of said eye pattern;
a pulse distortion of said eye pattern;
a cross-over point of said eye pattern;
a bit period of said eye pattern;
a bit-error-rate (BER) contour of said eye pattern; and
an extinction ratio of said eye pattern.

3. The method of claim 1 wherein said at least one receiver parameter comprises at least one of:

a gain of said receiver;
a frequency response of said receiver;
an equalization of said receiver;
a detection threshold of said receiver; and
a limiting threshold of said receiver.

4. The method of claim 1 further comprising periodically repeating said generating, said evaluating, and said adjusting while receiving said serial data signal with said receiver.

5. The method of claim 1 further comprising periodically repeating said generating, said evaluating, and said adjusting while receiving said serial data signal with said receiver.

6. The method of claim 1 wherein said receiver is intended to be used as a part of a serial data communication system and not as part of a piece of test equipment.

7. A method to construct an eye pattern from a serial data signal within a receiver of a serial data communication system, said method comprising:
    receiving a serial data signal with said receiver;
    generating a clock signal that is derived from said serial data signal within said receiver;
    generating timing data corresponding to phases of said clock signal within said receiver;
    sampling said serial data signal using said clock signal to generate sampled data within said receiver; and
    correlating said sampled data with said timing data to construct said eye pattern corresponding to said serial data signal.

8. The method of claim 7 further comprising phase shifting said clock signal within said receiver to shift a sampling point over said serial data signal.

9. The method of claim 7 wherein a frequency of said clock signal is less than a maximum bit rate of said serial data signal.

10. The method of claim 7 wherein a maximum bit rate of said serial data signal is an integer multiple of a frequency of said clock signal.

11. The method of claim 7 wherein said sampled data comprises voltage values or current values.

12. The method of claim 7 wherein said eye pattern comprises a superposition of voltage values or current values versus time over said serial data signal.

13. The method of claim 7 wherein said receiver is intended to be used as a part of a serial data communication system and not as part of a piece of test equipment.

14. An apparatus, within a receiver used in a serial data communication system, to construct and monitor an eye pattern from a serial data signal received by said receiver, said apparatus comprising:
    a first circuit to generate a first clock signal from said serial data signal;
    a second circuit to generate a second clock signal from said first clock signal;
    a third circuit responsive to said second clock signal to generate a third clock signal by shifting a phase of said second clock signal, and to generate a related phase position corresponding to a current phase of said third clock signal;
    a fourth circuit used to sample and hold said serial data signal, said fourth circuit generating an aligned serial data signal;
    an analog-to-digital converter (ADC) to generate sampled data values from said aligned serial data signal in response to said third clock signal; and
    a data processor responsive to said sampled values and said phase position data to generate said eye pattern.

15. The apparatus of claim 14 wherein said first circuit comprises a clock and data recovery (CDR) circuit.

16. The apparatus of claim 14 wherein said second circuit comprises a divider circuit.

17. The apparatus of claim 14 wherein said third circuit comprises an interpolator circuit.

18. The apparatus of claim 14 wherein a speed of said ADC is low relative to a frequency of said first clock signal.

19. The apparatus of claim 14 wherein a frequency of said first clock signal corresponds to a maximum bit rate of said serial data signal.

20. The apparatus of claim 14 wherein a frequency of said first clock signal is an integer multiple of a frequency of said second clock signal.

21. The apparatus of claim 14 wherein said data processor analyzes at least one characteristic parameter of said eye pattern.

22. The apparatus of claim 14 wherein said data processor outputs a receiver control signal to adjust at least one receiver parameter as a result of analyzing at least one characteristic parameter of said eye pattern.

23. The apparatus of claim 14 wherein said data processor generates and outputs a warning signal if said eye pattern intersects or comes within a predetermined guard distance of at least one point of a predetermined bit-error-rate (BER) mask stored within said data processor.

24. The apparatus of claim 14 wherein said eye pattern comprises a superposition of voltage values or current values versus time over said serial data signal.

25. The apparatus of claim 14 wherein said receiver is intended to be used as a part of a serial data communication system and not as part of a piece of test equipment.

26. A system to adaptively adjust receiver parameters of a receiver used for receiving a serial data signal in a serial data communication system, said system comprising:
    one or more circuits for generating an eye pattern from said received serial data signal, said eye pattern based on correlating a sampled data signal with a phase position signal, said phase position signal derived from a clock signal derived from said serial data signal, said sampled data signal generated from sampling said serial data signal using said clock signal;
    said one or more circuits for evaluating at least one pre-defined characteristic of said eye pattern, said evaluating comprising measuring said at least one pre-defined characteristic to generate at least one measured value and comparing said at least one measured value to at least one pre-defined test value; and
    said one or more circuits for adjusting at least one receiver parameter of said receiver based on said evaluating.

27. The system of claim 26 wherein said at least one pre-defined characteristic comprises at least one of:
    a rise time of said eye pattern;
    a fall time of said eye pattern;
    a jitter of said eye pattern;
    a vertical eye opening of said eye pattern;
    a horizontal eye opening of said eye pattern;
    an inter-symbol interference of said eye pattern;
    a pulse distortion of said eye pattern;
    a cross-over point of said eye pattern;
    a bit period of said eye pattern;
    a bit-error-rate (BER) contour of said eye pattern; and
    an extinction ratio of said eye pattern.

28. The system of claim 26 wherein said at least one receiver parameter comprises at least one of:
    a gain of said receiver;
    a frequency response of said receiver;
    an equalization of said receiver;
    a detection threshold of said receiver; and
    a limiting threshold of said receiver.

29. The system of claim 26 wherein said one or more circuits continuously repeats said generating, said evaluating, and said adjusting while said serial data signal is received by said receiver.

30. The system of claim 26 wherein said one or more circuits periodically repeats said generating, said evaluating, and said adjusting while said serial data signal is received by said receiver.

31. The system of claim 26 wherein said receiver is intended to be used as a part of a serial data communication system and not as part of a piece of test equipment.

32. A system to construct an eye pattern from a serial data signal within a receiver of a serial data communication system, said system comprising:

one or more circuits for receiving a serial data signal;

said one or more circuits for generating a clock signal that is derived from said serial data signal;

said one or more circuits for generating timing data corresponding to phases of said clock signal within said receiver;

said one or more circuits for sampling said serial data signal using said clock signal to generate sampled data within said receiver; and said one or more circuits for correlating said sampled data with said timing data to construct said eye pattern corresponding to said serial data signal.

33. The system of claim 32 wherein said one or more circuits performs phase shifting of said clock signal to shift a sampling point over said serial data signal.

34. The system of claim 32 wherein a frequency of said clock signal is less than a maximum bit rate of said serial data signal.

35. The system of claim 32 wherein a maximum bit rate of said serial data signal is an integer multiple of a frequency of said clock signal.

36. The system of claim 32 wherein said sampled data comprises voltage values or current values.

37. The system of claim 32 wherein said eye pattern comprises a superposition of voltage values or current values versus time over said serial data signal.

38. The system of claim 32 wherein said receiver is intended to be used as a part of a serial data communication system and not as part of a piece of test equipment.

* * * * *